3,152,001
PROCESS FOR THE PRODUCTION OF A FILLER

Ernst Podschus and Werner Joseph, Leverkusen, and Rudolf Clamroth, Cologne-Stammheim, Germany, assignors to Farbenfabriken Bayer Aktiengesellschaft, Leverkusen, Germany, a corporation of Germany
No Drawing. Filed Feb. 15, 1961, Ser. No. 89,372
Claims priority, application Germany Feb. 18, 1960
9 Claims. (Cl. 106—306)

The reinforcing effect of a filler in elastomers increases, the finer its particles. It is thereby a prerequisite that the filler is dispersible. In general, the dispersibility becomes more difficult as the primary particles become smaller, i.e., as the specific surface becomes larger, on account of the increasing tendency to agglomerate. The decisive factor for dispersibility is the secondary structure of the filler which should be as loose and spacious as possible.

The present invention involves a process for the manufacture of a filler containing calcium carbonate in which process calcium carbonate is precipitated and the freshly precipitated calcium carbonate is incorporated in a filler containing silicic acid. According to one modification of the process for the production of readily dispersible finely divided fillers finely divided calcium carbonate is suspended in at least one of the aqueous solutions reacted with one another for precipitating a barely soluble silicate, whereby the precipitation of the silicate is carried out in the presence of the calcium carbonate, and processing the resulting precipitation product in conventional manner to form a filler.

According to a preferred method of carrying out the invention, the precipitation of $CaCO_3$ is effected as rapidly as possible with the addition of active silicic acid (e.g., 5%) or of active silicic acid and nitriloacetic acid (e.g., 2% of $SiO_2$ and 0.5% of nitrilo-triacetic acid). Finely divided silicate is then precipitated onto the finely divided $SiO_2$-modified $CaCO_3$ with a specific surface of more than 60 m.$^2$/g. In this way, a finely divided calcium silicate or a sodium aluminium silicate may be precipitated, for example. It is also possible to treat such an alkaline silicate subsequently with acid in the presence of the calcium carbonate and to remove the cations Na· and Ca·· to a large extent without noticeably impairing the $CaCO_3$ provided the medium remains weakly alkaline. Surprisingly, the properties of such mixtures obtained by subsequent precipitations are not an addition of the properties of the components. When investigating the settling volume, for example, it will be found that a mixed product of separately precipitated, washed and dried $CaCO_3$ and calcium silicate obtained by subsequent mixing and grinding of the mixture, shows additive properties. The settling volume is approximately the arithmetic mean of that of the two components. In contrast thereto, it is substantially higher when calcium silicate is precipitated onto calcium carbonate, that is to say that, unexpectedly, the mixed filler becomes more voluminous and more easily dispersible.

The process is expediently carried out by first precipitating a finely divided $CaCO_3$ filler from, for example, a 0.5 molar $Ca(OH)_2$ suspension. The resulting $CaCO_3$ suspension is then used for diluting one of the two components or both of the silicate precipitation to be carried out subsequently, i.e., in the case of calcium silicate for diluting the $CaCl_2$ and/or the waterglass solution, in the case of sodium aluminium silicate only for diluting the waterglass solution, since the second component, i.e., the aluminium sulphate solution, would react with $CaCO_3$. A noticeable coarsening of $CaCO_3$ does not occur during the subsequent silicate precipitation, even if the latter is carried out with hot solutions. The designation "precipitating on" is not to imply that the silicate grows onto the $CaCO_3$ particles.

It is rather to be assumed that the silicate particles subsequently precipitated in the $CaCO_3$ suspension link the $CaCO_3$ particles thus imparting to the mixture an open but sufficiently solid structure which resists the tendency to shrink during the drying process.

The precipitation of extremely finely divided calcium silicate fillers has been described in, for example, U.S. patent specification No. 2,888,322. A silicate solution and a $CaCl_2$ solution of about 0.3 to 0.4 mol each, are continuously and rapidly mixed in a zone of high shearing force, or, if the process is carried out discontinuously, the $CaCl_2$ solution is prepared first and the waterglass solution directly introduced into the zone of high shearing force. Rapidly rotating turbo stirrers, for example, are suitable for achieving the high speed gradient. The finer the particles of the calcium silicate, the more glassy and thickly liquid the precipitate. The applicable concentration of very finely divided calcium silicate with a specific surface of about 100 m.$^2$/g. is therefore limited to 0.3 to 0.4-molar solutions. It is noteworthy that the $CaCO_3$ content of the precipitate of about 50–100 g./litre does not substantially increase the viscosity. It is thus possible, for example, to divide the $SiO_2$-modified $CaCO_3$ precipitate into two equal portions and to add to one portion so much $CaCl_2$ as to form a 0.3 molar solution and to the other portion so much waterglass, preferably approximately $Na_2O \cdot 3.3SiO_2$ as to render this solution likewise 0.3-molar. The $CaCO_3$-containing silicate solution is then run into the $CaCO_3$-containing $CaCl_2$ solution, the former entering the zone of the highest shearing force directly above or below the turbine.

In this way a filler is obtained which consists of about equal parts of $CaCO_3$ and calcium silicate, when starting from a 0.5-molar $CaCO_3$ precipitate. If it is desired to increase the $CaCO_3$ content, it is possible to increase the concentration of the $CaCO_3$ precipitate or also to reduce the concentration of the calcium silicate precipitate to, for example, 0.1 molar $CaCl_2$ and waterglass.

The process has the advantage that the combined precipitation of carbonate and silicate yields higher contents of solids. The precipitate is therefore better filterable than pure finely divided carbonate precipitates, the higher electrolyte content also contributing to this improvement.

According to another modification of the process for the production of a filler, a finely divided calcium carbonate which is still in the precipitation-moist state is mixed with a separately precipitated silicic acid-containing filler and processing the mixing product in conventional manner to give a filler.

The silicic acid-containing filler, i.e., silicic acid itself or a silicate, is preferably about equally finely divided as the calcium carbonate, that is to say both compounds should have a specific surface of at least 50 m.$^2$/g. A suitable finely divided silicic acid is obtained for example according to U.S. patent specification No. 2,805,955, a suitable finely divided calcium silicate for example according to the already described process of U.S. patent specification No. 2,888,322. The mixing ratio of the two components may be chosen within a wide range; the addition of the silicic acid-containing filler is noticeably effective already in a proportion of 5 percent by weight, a proportion of between 10 and 20 percent by weight leads to a substantial loosening of the final product. In the mixed fillers to be produced according to the invention the calcium carbonate component as well as the silicic acid component may preponderate. As the case may be, they will show in their rubber-reinforcing effect more the properties of calcium carbonate fillers or those of silicic acid or silicate fillers.

Compared with the last mentioned fillers the mixed filler offers in the first place an economic advantage, since the calcium carbonate component is obtainable at lower cost than the filler based on silicic acid alone. Compared with the latter in technological respect, calcium carbonate is known to give softer and more elastic vulcanisates; the mixed filler according to the invention, if precipitated in sufficiently fine particles (specific surface between 50 and 120 m.$^2$/g., silicic acid component even more), combines this effect with the high tensile strength and tear resistance which can be obtained only with sufficiently finely divided fillers and has therefore not been obtained with the calcium carbonate powders hitherto known. Calcium carbonate in general is known to have the tendency of sticking to the counter-roll when mixing with the rubber in a roller mill; this disadvantage is likewise reduced or obviated by using the mixed filler.

For the production of finely divided calcium carbonate precipitates various methods may be considered by which an inhibition of the crystal growth of the $CaCO_3$ crystallites is attained. Methods based on direct carbonation of milk of lime are especially advantageous, for example, by the already mentioned addition of small amounts of active silicic acid to milk of lime with rapid carbonation at initial temperatures of about 20° C., there may be produced finely divided $CaCO_3$ precipitates with a specific surface of more than 50 m.$^2$/g. Additions of polybasic hydroxy-carboxylic acids lead likewise to finer grain. It is true that especially in the last mentioned case, however, working up leads to a calcium carbonate which is finely divided but forms such a hard agglomerate that it cannot be considered to be used as a filler for lack of dispersibility. Here also the admixture with silicic acid or precipitated silicate fillers according to the invention yields loose mixed fillers.

In carrying out the process of the invention, the following details should be noted: finely divided calcium carbonate with a specific surface of more than 50 m.$^2$/g. obtained by precipitation from milk of lime by means of carbon dioxide-containing gases under suitable conditions, has the tendency to be initially cloudy when passing the filter cloths. This defect is overcome by the addition of about 10 to 20% of a silicate or precipitated silicic acid filler of approximately the same concentration. If the precipitated silicic acid filler is not used directly, but a suspension largely freed of soluble salts by decanting or filtering, higher additions are required for a clear filtration of the calcium carbonate precipitate; however, the loosening effect remains the same. A dry mixing of calcium carbonate and silicic acid or silicate fillers has not the desired effect.

Compared with the first mentioned possibility of silicate precipitation in the presence of finely divided $CaCO_3$ the process according to this modification of the invention has the advantage that a combination with pure silicic acid which is the most active agent in rubber technique, is likewise possible without difficulties.

The resulting fillers are superior to commercial $CaCO_3$ fillers and even to silicate fillers with regard to their reinforcing effect on rubber.

The following examples are given for the purpose of illustrating the invention.

Example 1

50 litres of a 0.65-molar calcium hydroxide suspension with a content of 2% of $SiO_2$, added in the form of waterglass ($Na_2O \cdot 3.3SiO_2$), and 0.75% of nitrilo-triacetic acid (sodium salt) are carbonated with a mixture of $CO_2$ and air (1000 litres of $CO_2$, 4000 litres of air per hour). The distribution of the gas is carried out with the aid of a "Kotthoff" mixing mill (diameter of rotor 75 mm., 2800 r.p.m.). The reaction is terminated after 65 minutes. The temperature rises from 17 to 28° C.

The $CaCO_3$ suspension is divided into two equal portions. To the first portion there is added so much $CaCl_2$ as to form a 0.1-molar $CaCl_2$ solution. To the second portion there is added so much sodium silicate ($Na_2O \cdot 3.3SiO_2$) as to form a silicate solution with 0.1 mol of $Na_2O$. Portion 1 is placed in the apparatus and portion 2 is added thereto within 20 minutes through a tube ending directly above the rotor of the Kotthoff mill. The resulting filter cake contains 26.5% of solids. After washing, drying and grinding, a very loose filler is obtained having a specific surface of 75 m.$^2$/g., a settling volume (2 g. in 98 g. of toluene) of 42 cc. and an oil adsorption of 1.33 cc./g. The content of hydrated calcium silicate amounts to about 20%.

A second $CaCO_3$ batch treated under the same conditions but without subsequent precipitation of calcium silicate yields a filler with a specific surface of 79 m.$^2$/g. and a settling volume of only 18 cc.

Example 2

To 16 l. of 0.5 molar milk of lime there are added 3% tartaric acid (referred to $CaCO_3$) in form of a concentrated aqueous solution. A gas stream consisting of a mixture of 500 l. of $CO_2$ and 2000 l. of air per hour is introduced into the suspension by means of a Kotthoff mixing mill. After obtaining a pH value of 7.5 a portion of the precipitate is worked up by filtering and drying. The filter cake obtained is so hard that grinding by the method which is customary for fillers with comminution of the large-size agglomerates, i.e., by means of a high-speed pin mill, is not possible. The product comminuted in the mortar by hand shows a specific surface of 76 m.$^2$/g. (measured according to BET).

The larger part of the $CaCO_3$ precipitate is divided into two equal portions. Calcium chloride is added to the first portion and sodium silicate ($Na_2O \cdot 3.35SiO_2$) to the second portion in such quantities that a 0.05 molar solution each is formed (referred to $Na_2O$ in the case of sodium silicate). The sodium silicate containing portion is added to the $CaCl_2$ containing suspension within 10 minutes while stirring with the Kotthoff mixing mill and introducing the silicate solution closely above the rotor. The mixture thus obtained is worked up by filtering, washing, drying and grinding in a pin mill. The dry filter cake is substantially softer and more voluminous than the filter cake obtained in the experiment described in the first paragraph of this example. The resulting loose filler contains about 13% of calcium silicate. The settling volume is 32 cm.$^3$ and the specific surface 128 m.$^2$/g. A photograph taken under the electron microscope shows agglomerates of slightly higher density than the product obtained according to Example 1 having extremely finely divided primary particles of an average diameter below 0.02$\mu$.

Example 3

To 200 litres of milk of lime containing 0.6 mol of $Ca(OH)_2$ per litre, there are added 600 g. of $SiO_2$ in the form of sodium silicate (5% of $SiO_2$ referred to $CaCO_3$) and a mixed gas stream of 5 m.$^3$ of $CO_2$ and 20 m.$^3$ of air per hour is introduced, until the precipitation of calcium carbonate is completed. For the distribution of gas a device is used which is obtainable on the market under the name of Kotthoff mixing mill Type MS 3 and in which the gas is conducted directly over the rotor. When a sample is taken from the resulting suspension and the precipitation product, after filtering is dried and ground in a pin mill, it shows a specific surface of 82 m.$^2$/g. and a settling volume (2 g. shaken in 98 g. of toluene) of 23 cc.

In order to produce the finely divided calcium silicate precipitate to be used according to the invention, 8 litres of a waterglass solution with 0.3 mol ($Na_2O \cdot 3.3SiO_2$) per litre are added to 8 litres of a calcium chloride solution with 0.3 mol of $CaCl_2$ per litre, using as stirrer a device obtainable on the market under the name of Kotthoff mixing mill MS 2 and introducing the waterglass solution immediately above the rotor. The resulting suspension is then added to 16 litres of a calcium carbonate suspension prepared in the manner described above, the mixture is filtered, the filter residue washed, dried and ground and a mixed filler is thus obtained consisting of about 89 percent by weight of $SiO_2$-modified $CaCO_3$ and about 11 percent by weight of calcium silicate and having a specific surface of 92 m.$^2$/g. Its settling volume (2 g. shaken in 98 g. of toluene) amounts to 44 cc. In an electron microscope picture the calcium carbonate particles and the calcium silicate particles cannot be distinguished from one another.

Example 4

16 litres of a 0.5 molar milk of lime are mixed with 6% of SiO—referred to $CaCO_3$ to be formed—in form of silica sol (5% $SiO_2$, pH 3) freshly prepared from a sodium silicate solution ($Na_2O \cdot 3.35SiO_2$) and hydrochloric acid. Beginning at 17° C., a gas stream containing 20% $CO_2$ is introduced (2500 litres per hour) with vigorous stirring until a pH value of 9.3 is obtained. After filtering, washing and drying, a small sample taken from the precipitation shows a specific surface area of 96 m.$^2$/g. (measured according to BET).

In a second experiment 8 litres of a 0.3 molar sodium silicate solution ($Na_2O \cdot 3.35SiO_2$) are added to 8 litres of a 0.3 molar $CaCl_2$ solution with vigorous stirring as described in Example 1. A mixing series is prepared from the calcium carbonate and the calcium silicate precipitation. Each mixture as well as the pure precipitates are filtered on a suction filter in vacuum under equal conditions. The filter cakes are given a cylindrical shape of equal dimensions by pressing the filter cakes into glass cylinders of 45 mm. high and 30 mm. diameter. The filter cakes of cylindrical shapes are then dried at 110° C. while avoiding any damage, and subsequently measured and weighed. The quotient of the volumina $V/V_0$, $V$ indicating the volume after drying and $V_0$ the volume of the wet filter cakes, and the apparent density of the dried filter cakes of cylindrical shape are characteristic for the looseness of the secondary structure and the degree of shrinkage. The table below shows $V/V_0$, $Ds$ and the dry contents of the filter cakes in dependence of the mixing ratio in percent by weight.

| Calcium silicate filler, percent | $CaCO_3$ filler, percent | $V/V_0$ | $Ds$ | Solids content of filter cakes, percent |
|---|---|---|---|---|
| 0 | 100 | 35.9 | 0.76 | 22.5 |
| 15 | 85 | 55.3 | 0.44 | 20.4 |
| 30 | 70 | 43.7 | 0.46 | 17.8 |
| 50 | 50 | 39.0 | 0.49 | 16.2 |
| 60 | 40 | 34.8 | 0.51 | 15.6 |
| 70 | 30 | 28.6 | 0.53 | 13.9 |
| 100 | 0 | 23.9 | 0.52 | 12.5 |

The table shows that the mixtures shrink to a lesser extent (higher $V/V_0$-values) than the pure calcium silicate filter cake; up to about 50% calcium silicate content a lesser shrinkage occurs than with pure calcium carbonate and that the degree of shrinkage is lowest at a calcium silicate content of about 15%. In the aforesaid range, the filter cake shows the loosest structure and is distinctly more voluminous than the filter cake of the pure individual components.

Example 5

To 185 litres of a 0.5 molar milk of lime (90 mols of $Ca(OH)_2$) are added to 4% of $SiO_2$—referred to $CaCO_3$ to be formed—in form of silica sol freshly prepared from a sodium silicate solution and hydrochloric acid. Beginning at a temperature of 17° C., carbonization is effected by introducing a gas stream of 5 m.$^3$ of $CO_2$ and 20 m.$^3$ of air per hour until a pH value of 9.2 is obtained. The resulting calcium carbonate precipitate is mixed with 2.8 litres of a 1.7 molar $CaCl_2$ solution. Sodium silicate solution (commercial waterglass, $Na_2O \cdot 3.35 SiO_2$, in a dilution of 1:1) is added by means of a Kotthoff mixing mill within 10 minutes in a quantity equivalent to $CaCl_2$. The silicate solution is fed in directly above the rotor. The mixture is worked up in usual manner by filtering, washing, drying and grinding. The filler thus obtained contains about 13% of subsequently precipitated calcium silicate and has a specific surface of 98 m.$^2$/g.

The reinforcing effect of the filler on natural rubber is tested with the following composition:

| | |
|---|---|
| Sheets | 100.0 |
| Filler | 50.0 |
| Zinc oxide | 5.0 |
| Stearic acid | 2.0 |
| Cumarone resin | 1.5 |
| A mixture of 25 parts by weight of the cyclohexyl amine salt of coconut acid, 35 parts by weight ethylene glycol, 40 parts by weight formamide | 1.3 |
| Dibenzo thiacyl disulfide | 0.9 |
| Diphenyl guanidine | 1.0 |
| Sulfur | 3.0 |

For control purposes the best quality calcium carbonate filler available on the market (specific gravity about 30 m.$^2$/g.) is incorporated into the aforesaid composition. The vulcanizates produced therefrom have the following mechanical properties (the data were determined after vulcanizing for 20 minutes).

| | Tensile strength | Hardness (Shore) | Tear resistance (kg.) | Abrasion (mm.$^3$) |
|---|---|---|---|---|
| Commercial filler | 190 | 62 | 14 | 185 |
| Filler according to the invention | 235 | 62 | 29 | 152 |

We claim:
1. A process for the manufacture of a siliceous calcium carbonate pigment which comprises precipitating a suspension of finely divided, calcium carbonate, promptly distributing said calcium carbonate suspension in one of two aqueous solutions which solutions upon reaction with one another precipitate a difficulty soluble silicate and mixing said aqueous solutions whereby to precipitate said difficultly soluble silicate in a slurry of said calcium carbonate.

2. A process of claim 1 wherein the aqueous solutions are a calcium chloride solution and an aqueous alkali metal silicate solution.

3. The process of claim 1 wherein the aqueous slurry of difficultly soluble silicate-calcium carbonate filler is mixed with acid while maintaining the treating medium weakly alkaline.

4. Process as claimed in claim 2 in which the difficultly soluble silicate is precipitated by reacting an aqueous sodium silicate solution in which finely divided freshly precipitated calcium carbonate is suspended with an aqueous solution of calcium chloride.

5. Process as claimed in claim 2 in which the difficultly soluble silicate is precipitated by reacting an aqueous calcium chloride solution in which finely divided freshly precipitated calcium carbonate is suspended with an aqueous solution of sodium silicate.

6. Process as claimed in claim 1 in which difficultly soluble sodium aluminium silicate is precipitated by reacting an aqueous sodium silicate solution in which finely divided freshly precipitated calcium carbonate is suspended with an aqueous solution of aluminium sulfate.

7. In a process for the manufacture of a silicic acid-calcium carbonate filler, the steps which comprise precipitating finely divided calcium carbonate as a suspension and while it is freshly precipitated and still in a precipitation moist state incorporating the calcium carbonate in a finely divided silicic acid filler.

8. The method of claim 1 wherein the precipitated calcium carbonate has a surface area of at least 50 square meters per gram.

9. In a process for the manufacture of a calcium silicate-calcium carbonate filler, the steps which comprise precipitating finely divided calcium carbonate as a suspension and while it is freshly precipitated and still in a precipitation moist state incorporating the calcium carbonate in a finely divided calcium silicate filler.

References Cited in the file of this patent

UNITED STATES PATENTS

| | | |
|---|---|---|
| 2,259,481 | Mowlds | Oct. 21, 1941 |
| 2,259,482 | Mowlds | Oct. 21, 1942 |
| 2,314,188 | Allen | Mar. 16, 1943 |
| 2,385,379 | Rafton | Sept. 25, 1945 |
| 2,470,577 | Roderick et al. | Mar. 17, 1949 |
| 2,865,781 | Wainer | Dec. 23, 1958 |